(12) United States Patent
Rowe

(10) Patent No.: US 8,689,252 B1
(45) Date of Patent: Apr. 1, 2014

(54) REAL-TIME OPTIMIZATION OF ADVERTISEMENTS BASED ON MEDIA USAGE

(75) Inventor: Simon M. Rowe, Finchampstead (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/365,112

(22) Filed: Feb. 2, 2012

(51) Int. Cl.
*H04N 7/10* (2006.01)

(52) U.S. Cl.
USPC .................................. 725/34; 725/32; 725/36

(58) Field of Classification Search
USPC .................................. 725/32, 34–36, 109–113
See application file for complete search history.

(56) References Cited

U.S. PATENT DOCUMENTS

| | | | |
|---|---|---|---|
| 7,136,830 B1 * | 11/2006 | Kuelbs et al. ................. | 705/26.2 |
| 7,861,260 B2 | 12/2010 | Shkedi | |
| 2002/0046118 A1 * | 4/2002 | Minte ............................. | 705/14 |
| 2002/0090997 A1 * | 7/2002 | Bailey ............................ | 463/42 |
| 2002/0166127 A1 * | 11/2002 | Hamano et al. ................ | 725/105 |
| 2005/0120391 A1 * | 6/2005 | Haynie et al. ................... | 725/135 |
| 2006/0265280 A1 | 11/2006 | Nakada et al. | |
| 2007/0022437 A1 * | 1/2007 | Gerken ........................... | 725/41 |
| 2008/0114639 A1 | 5/2008 | Meek et al. | |
| 2008/0201731 A1 * | 8/2008 | Howcroft ........................ | 725/13 |
| 2009/0197616 A1 | 8/2009 | Lewis et al. | |
| 2011/0153429 A1 * | 6/2011 | Ullah ........................ | 705/14.64 |

* cited by examiner

*Primary Examiner* — Nasser Goodarzi
*Assistant Examiner* — Fred Peng
(74) *Attorney, Agent, or Firm* — Foley & Lardner LLP; John D. Lanza

(57) ABSTRACT

A method for optimization of advertisement selection includes determining that content received via a website channel and content received via an additional media channel are being concurrently consumed at a location. The additional media channel is one of a television channel, a radio channel, a movie channel, and a print channel. The method further includes receiving usage information regarding the content being consumed at the location via one of the website channel and the additional media channel, and selecting, based on the usage information, advertisements to concurrently present via the other channel at the same location.

17 Claims, 3 Drawing Sheets

US 8,689,252 B1

REAL-TIME OPTIMIZATION OF ADVERTISEMENTS BASED ON MEDIA USAGE

BACKGROUND

The present disclosure relates generally to the field of advertisements. More specifically, the present disclosure relates to a selection of advertisements for display on a media channel.

Advertisements may be displayed on a media channel (e.g., a television, a laptop, personal computer (PC), tablet, another device for accessing the Internet, a mobile phone, another mobile device, etc.). For example, advertisements may be commercials shown during a commercial break of a television program, advertisements may appear on a website a user is browsing, etc. A person may be using multiple media channels simultaneously. For example, someone may be watching television and surfing the Internet on a tablet at the same time.

SUMMARY

One implementation of the present disclosure relates to a method. The method includes determining that content received via a website channel and content received via an additional media channel are being concurrently consumed at a location, wherein the additional media channel is one of a television channel, a radio channel, a movie channel, and a print channel. The method further includes receiving usage information regarding the content being consumed at the location via one of the website channel and the additional media channel. The method further includes selecting, based on the usage information, advertisements to concurrently present via the other channel at the same location.

Another implementation of the present disclosure relates to one or more computer readable media having instructions stored therein, the instructions being executable by one or more processors to cause the one or more processors to perform operations. The instructions include determining that content from a television channel and content from an additional media channel are being concurrently consumed at a location, wherein the additional media channel is one of a website, a radio channel, a movie channel, and a print channel. The instructions further include receiving usage information regarding the content being consumed at the location via one of the television channel and the additional media channel. The instructions further include selecting, based on the usage information, advertisements to concurrently present at the same location via the other one of the television channel and the additional media channel.

Another implementation of the present disclosure relates to a method. The method includes determining that content from a first media channel and content from a second media channel are being concurrently consumed at a location, wherein the first media channel and second media channel are different modalities, wherein the modality of the first media channel and the second media channel are different ones of a television channel, a website channel, a radio channel, a movie channel, and a print channel. The method further includes receiving usage information regarding the content being consumed at the location via the first media channel. The method further includes selecting, based on the usage information, advertisements to concurrently present via the second media channel at the same location.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION OF THE EXEMPLARY EMBODIMENTS

Referring generally to the figures, systems and methods for optimization of advertisements is shown and described. A user may often consume content via multiple media channels simultaneously, at the same location. The media channels may be in different modalities (e.g., the user may be simultaneously surfing the web on a tablet, PC, or laptop and watching TV in the same room). The media channels may be connected to an advertisement system or other optimization system, which collects usage data from the media channels and uses the usage data to determine advertisements to display to the user via the media channels. In an example embodiment, usage data for a first media channel is used to determine advertisements to concurrently display to the user via the second media channel. For example, website content for a website that the user is browsing on a tablet may be used to determine the type of advertisement shown on the television to the user. As another example, the type of television program a user is watching may be used to determine the type of advertisements shown on a website the user is browsing. Using the knowledge of content on the media channels, the advertisements shown on the media channels may be optimized in order to take account of a context or priming effect on the person using the media channels.

Further, user identity information can be used in addition to usage information to select advertisements. For example, the user of the multiple media channels may be identified and the systems and methods of the present disclosure may be implemented when the users of the multiple media channels are the same.

Figure 1:
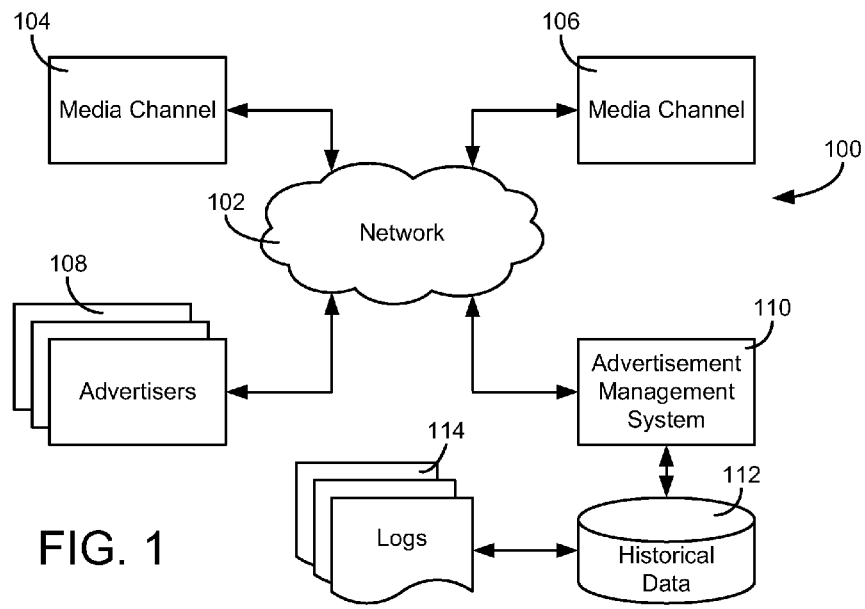
FIG. 1 is a block diagram of an advertisement system, in accordance with a described implementation.

Referring to FIG. 1, a block diagram of an environment 100 in which an advertisement management system manages advertisement services for multiple media channels is shown in accordance with a described implementation. Environment 100 is provided as an example of an advertisement system or other optimization system that may be used with the systems and methods of the present disclosure.

Environment 100 includes a network 102, such as a local area network (LAN), a wide area network (WAN), the Internet, or a combination thereof. Network 102 may connect multiple media channels 104, 106, advertisers 108, and advertisement management system 110. Environment 100 may include any number of media channels and advertisers. Advertisers 108 connect to media channels 104, 106 through network 102 and provides advertisement content to media channels 104, 106 for display to a user. Advertisers 108 may receive preference data from, for example, advertisement management system 110 to determine which advertisements to transmit to media channels 104, 106 for display. Advertisers 108 may be a single advertiser, multiple advertisers of a particular genre or interest, or advertisers across multiple genres and interests. In one embodiment, advertisers 108 may simply be or include one or more databases that advertisements are selected from by advertisement management system 110. The interaction between advertisers 108 and the rest of environment 100 is described in greater detail below with respect to advertisement management system 110.

The advertisements provided by advertisers 108 or from another source may be image advertisements, flash advertisements, video advertisements, text-based advertisements, or any combination thereof. It should be understood that the type of advertisement displayed to a user of a media channel as described in the present disclosure may vary according to various implementations.

Environment 100 includes multiple media channels 104, 106. While environment 100 includes two media channels, it should be understood that the systems and methods of the present disclosure may be applied to an environment including more than two media channels. Media channels 104, 106 may be of any type of medium used to provide an output for one or more users of the media channel. The media channel may be a television channel, website channel (e.g., a webpage), a radio channel, a movie channel, a print channel (e.g., a channel that allows a user to electronically access print media), or any other type of channel. A media channel may be displayed on a television, a laptop, tablet, or personal computer (PC), a mobile phone, a screen or monitor configured to provide a display, or may be any other type of electronic device or display. The media channel may be configured to allow a user to watch a television show, listen to music, access the Internet, or otherwise consume any other type of media. The media channel may further be configured to provide an advertisement component as well as the media. In the present disclosure, the term "media channel" is used to describe any channel through which media may reach a user (e.g., television, radio, web) regardless of the physical device used to display the media. For example, a user that is simultaneously reading newspaper articles and watching television on a computer display is simultaneously receiving media through two media channels. Media channels 104, 106 may be connected to the rest of environment via network 102 (e.g., if the media channel output is a tablet, PC, laptop, or other device able to connect to the Internet and/or network 102). Media channels 104, 106 may alternatively be locally or remotely connected to advertisement management system 110 or other components of environment 100. For example, a media channel may be a television channel broadcast through the air for reception by an antenna and display on a television set.

The modalities of media channels 104, 106 may be different according to described implementations. For example, media channel 104 may be a television channel and media channel 106 may be a website channel. Media channels 104, 106 may be displayed on different electronic devices or may be displayed on the same electronic device (e.g., a stream of a movie and a print media website may be viewed by a user on the same laptop or tablet).

The electronic devices on which media channels 104, 106 are accessed from may typically include a user application. For example, a laptop, PC, or tablet may include a web browser configured to provide access to the Internet for a user. The electronic devices may be configured to send and receive data over network 102. For example, the user application of the electronic device may be configured to facilitate the sending and receiving of data over network 102. As another example, a processing circuit of the user device may be configured to receive data regarding usage of the user device, and the processing circuit is then configured to facilitate the sending of the usage data. Electronic devices that may be used with the systems and methods of the present disclosure are described in greater detail in FIGS. 3-5.

Advertisement management system 110 is shown connected to network 102. Advertisement management system 110 may be configured to select advertisements to show on the various media channels 104, 106. As one example, advertisement management system 110 may select advertisements to show during commercial breaks of a television program. As another example, advertisement management system 110 may select advertisements to show on a webpage the user is browsing. Selecting website advertisements may include determining a format of the advertisement that can be displayed on the website (e.g., if the advertisement has to be text-based, can be a video or a still image, the size of the advertisement in pixels, etc.). Advertisement management system 110 may determine a type of advertisement to display and then may select one or more advertisement from advertisers 108 that fit the criteria. Advertisers 108 may alternatively select an advertisement upon receiving advertisement preference information from advertisement management system 110 in another implementation.

Figure 2:
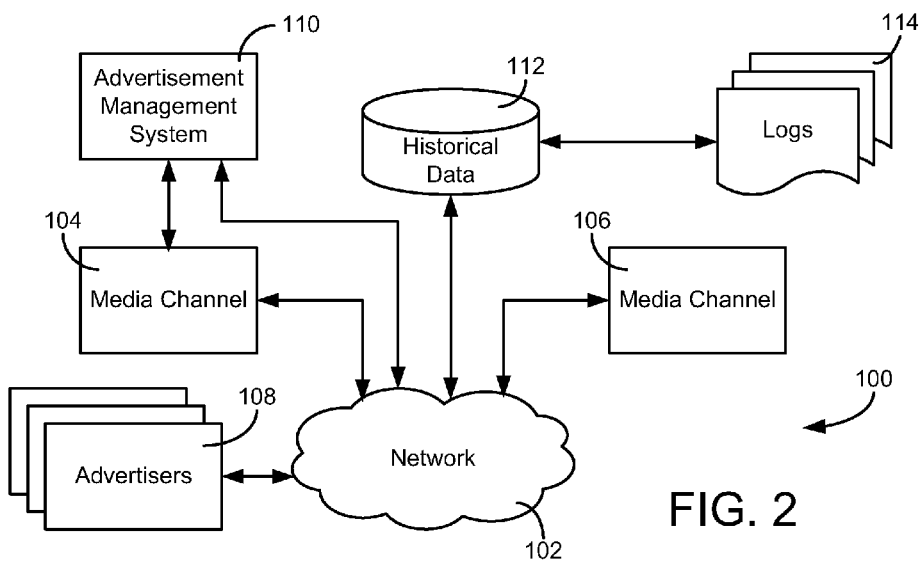
FIG. 2 is a block diagram of an advertisement system, in accordance with another described implementation.

Referring also to FIG. 2, a block diagram of another environment 200 is shown in accordance with another described implementation. Compared to environment 100 of FIG. 1, advertisement management system 110 is shown connected to a media channel 104 in addition to network 102. While the advertisement management system 110 of FIG. 1 is shown located remotely from both media channels 104, 106 in FIG. 1; in the implementation of FIG. 2, advertisement management system 110 is directly connected to media channel 104. Advertisement management system 110 may be local to media channel 104, according to one implementation. Advertisement management system 110 may receive advertisements from advertisers 108 via network 102 and directly provide the advertisements to media channel 104. Further, advertisement management system 110 may be configured to store the advertisements in local storage for future use. For example, if advertisement management system 110 is part of a set-top box for a television, the set-top box may store the advertisement information in memory. It should be understood that advertisement management system 110 may otherwise be connected to one or more media channels, or to any other component of system 100, either locally or remotely, according to various implementations. Such configurations are described in greater detail in FIGS. 3-5.

Advertisement management system 110 may receive a request for advertisements from media channels 104, 106 or via another source. The request for advertisements may include characteristics of the advertising slots or spaces that will be filled by the advertisements. For example, dimensions of an advertisement slot on a website may be provided, media types that are available for presentation in the advertisement space may be specified, etc. The information can be used to help select eligible advertisements.

The request for advertisements may include an identification of usage data of media channel 104, 106, an identification of user data from a user of media channel 104, 106, and/or an identification of other parameters. Advertisement management system 110 may assign interest data to the user of a media channel or to the media channel itself based on the identification of usage data and select advertisements to be provided by advertiser 108 that relate to the interest data. The interest data is representative of a genre, topic, interest, or other characteristic of the usage of media channels 104, 106. For example, interest data may relate to a type of website viewed by a user (e.g., a news site, a blog or forum, personal websites or social networking sites, etc.) and the interest data is assigned to the user. As another example, interest data may relate to the content of a website viewed by a user (e.g., the topic of the blog or forum the user is browsing) and the interest data is assigned to the user. As yet another example, interest data may relate to the type of television show being watched on a media channel (e.g., news, sports, comedy, drama, etc.) and the interest data is assigned to the media channel.

Advertisement management system 110 may associate content (e.g., keywords, pictures, videos, etc.) with the interest data to provide advertisements that are relevant to the user. For example, a video may be manually tagged with one or more keywords describing the video content at different points in the video. Based on the interest data, advertisement management system 110 may provide advertisements in response to the request, the advertisements having characteristics matching the user data identified by the user. For example, during a portion of a movie involving a car chase, the video may include manually placed tags comprising the keyword "sports cars." For a user that is both watching the video and reading a newspaper article, such tagging may potentially triggering presentation advertisements relating to sports cars in the newspaper article being read by the user. As another example, a picture may be tagged manually with one or more keywords or a caption describing the picture.

In one implementation, advertisement management system 304 may use the interest data to select advertisements as described above. The advertisements available for selection may be selected based on any number of factors. For example, advertisers may provide keyword bids for advertisements they wish to display, and advertisement management system 304 may select the advertisements based on the bids and other factors. Keyword bids may be bids on specific keywords placed by the advertiser that represents a cost the advertiser is willing to pay to have an advertisement displayed on a media channel when a content related to the keyword is to be displayed. The keyword may be representative of the interest data as described above. For example, in the above example, the content is related to sports cards, and the advertiser places a bid on the keyword sports cars. After receiving a keyword (or other description), advertisement management system 110 may review bids placed on the keywords and select an advertisement associated with the highest bid. Further, advertisement management system 110 may select advertisements based on an expected performance of the advertisement in addition to the bid.

Advertisement management system 110 selects one or more eligible advertisements for each advertisement slot of the media channel (e.g., for each 30-second block of time for a television commercial, for each advertisement unit displayed on a website, etc.). User data representing user interactions with the presented advertisements may be stored in a historical data store 112. For example, when an advertisement is presented to the user via a media channel 104, 106, the data may be stored in a log file 114. This log file 114 may be aggregates with other data in historical data store 112. Accordingly, historical data store 112 may contain data representing advertisement display on media channels 104, 106 for a particular user. For example, information about previous advertisements shown to a user and interest data may be stored in the database.

Similarly, when a user selects (e.g., clicks, touches, signals, etc.) a presented advertisement, data representing the selection of the advertisement may be stored in log file 114 or historical data store 112. The selection may be related to a click on a website advertisement, a pressing of a button on a television remote, etc.

Log files 114, or historical data store 112, also store references to advertisements and data representing conditions under which each advertisement was selected for presentation to a user. For example, historical data store 112 may store keywords and other criteria with which eligible advertisements are selected for presentation. Additionally, historical data store 112 may include data that specifies a number of impressions for each advertisement and the number of impressions for each advertisement may be tracked, for example, using the keywords that caused the advertisement impressions and/or the cookies that are associated with the impressions. Data for each impression may also be stored so that each impression and user selection may be associated with (i.e., stored with references to and/or indexed according to) the advertisement that was selected and/or the targeting keyword or other information that caused the advertisement to be selected for presentation.

Environment 100 is illustrated as an example environment for use with the systems and methods of the present disclosure; in various implementations, environment 100 may include more or less systems and modules for use with the systems and methods of the present disclosure.

Figure 3:
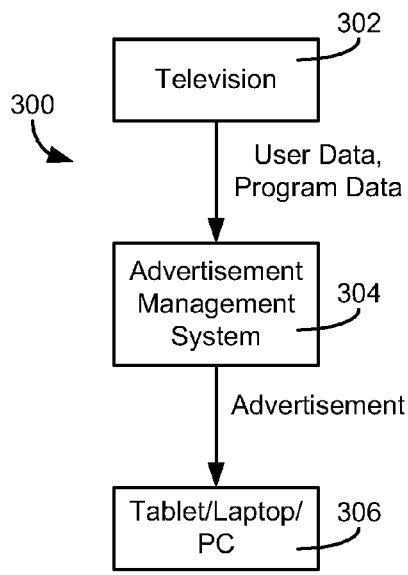
FIG. 3 is a data flow diagram of a possible configuration of media channels in an advertisement system, in accordance with a described implementation.
Figure 4:
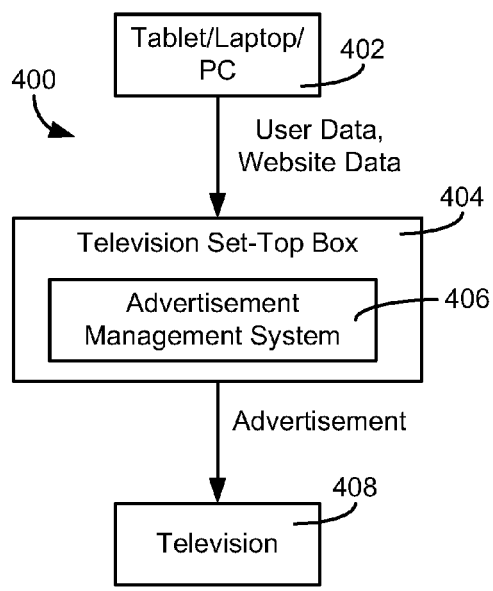
FIG. 4 is a data flow diagram of a possible configuration of media channels in an advertisement system, in accordance with another described implementation.
Figure 5:
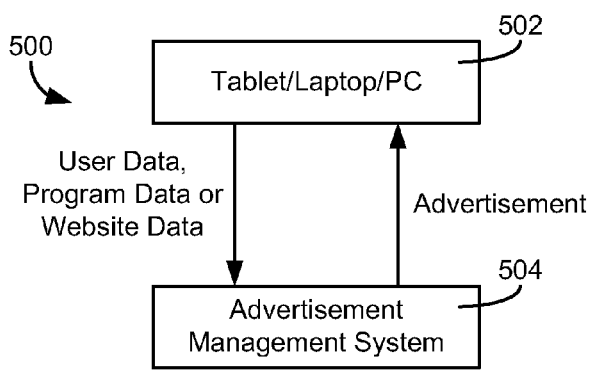
FIG. 5 is a data flow diagram of a possible configuration of media channels in an advertisement system, in accordance with another described implementation.

Referring generally to FIGS. 3-5, data flow diagrams of three example configurations are shown which illustrate media channels in an advertisement system. It should be understood that the configurations shown in FIGS. 3-5 are presented by way of example only and that any type of configuration including any type of media channel or any number of electronic devices may be used to execute the systems and methods described herein.

Referring now to FIG. 3, a configuration of an advertisement system 300 includes two media channels displayed on television 302 and a tablet (or laptop, PC, or other computing device) 306. A television program may be viewed on television 302 by a user. Advertisement management system 304 may request and receive user data and interest data from television 302 or other source. User data may relate to a user identification or other characteristic used to identify the user watching television 302. Interest data may include information relating to the programs being viewed (e.g., title of the program, description of the program, content of the program, program rating, etc.) or the channel being watched (e.g., a news channel, sports channel, food channel, entertainment channel, etc.). The channel information may be provided by a television set-top box, for example. In another implementation, a microphone or other audio input device on the computing device 306 may capture audio from a television program, and the audio may be communicated back to the advertisement management system 304 and compared with audio from a range of television programs known to be airing at that time and used to identify the particular television program the user is watching. In one implementation, interest data includes program annotations, electronic program guide (EPG) information, sub-titles, keywords, text, or other data that can be used to identify a genre or subject of the television program. In another implementation, interest data may include data relating to specific scenes of a television program (e.g., a scene in a food show relating to a specific type of food). In yet another implementation, one or more scenes, or an entire television program, may be manually annotated by a broadcaster, and the annotation may be used as interest data. Advertisement management system 304 uses the user data and program data to select advertisements to show to the user.

Advertisement management system 304 may transmit the custom selected advertisements to tablet 306, assuming that the user of tablet 306 is the same user as the user of television 302. Advertisement management system 304 may verify that the user is the same for both devices independent of selecting advertisements, or may verify as a first step of a process of selecting advertisements. Tablet 306 may then be configured to display the advertisements when the user of tablet 306 is viewing a website or other interface where the advertisement may be displayed. In one example, if a basketball game is being watched on television 302, advertisements about upcoming basketball games, or basketball tickets, may be displayed on tablet 306. In another example, if the user is watching a food-related channel on television 302, advertisements for restaurants and grocery stores may be displayed on tablet 306.

Referring now to FIG. 4, a configuration of an advertisement system 400 includes two media channels displayed on tablet 402 and television 408. A website may be viewed on a browser of tablet 402, or another computer program may be viewed on tablet 402 (e.g., an application that allows a user to watch a movie or television program on tablet 402). Advertisement management system 406 may receive user data and website data from tablet 402. User data may relate to a user identification or other characteristic used to determine the user of tablet 402. Website data may include information relating to the website being viewed (e.g., the website address, a description of the website content, etc.), an article on the website, an image displayed on the website, or any other website content. Advertisement management system 406 uses the user data and website data to select advertisements to show to the user on television 408. Upon verification that a user of television 408 is the same as the user of tablet 402, advertisement management system 406 may transmit the custom selected advertisement information to television 408. Television 408 is then configured to display the advertisements. Television 408 may display the advertisements during commercial breaks of a television program currently being viewed, may display the advertisements in a corner of the display during a television program, or may display the advertisements in other ways (e.g., via a scroll at the bottom or top of the screen, by changing the display on the television to show two separate windows, etc.). In another implementation, instead of streaming video, the custom selected advertisement may be another type of advertisement (image advertisement, text advertisement, etc.) and set-top box 404 may provide television 408 with the advertisement when it is to be displayed.

Referring now to FIG. 5, a configuration of an advertisement system 500 includes two media channels displayed on a tablet 502. In the implementation of FIG. 5, the two media channels are displayed on the same device. For example, one media channel may be a streaming television program or movie and the second media channel may be a webpage. Advertisement management system 504 may request and receive user data from tablet 502 in addition to data relating to one of the media channels. For example, interest data for a television program may be provided. As another example, website data may be provided for a webpage. Advertisement management system 504 receives the data for one of the media channels and uses the data to select advertisements to display on the other media channel. For example, if website data was received, advertisement management system 504 may determine advertisements to display in the streaming television program or movie.

Figure 6:
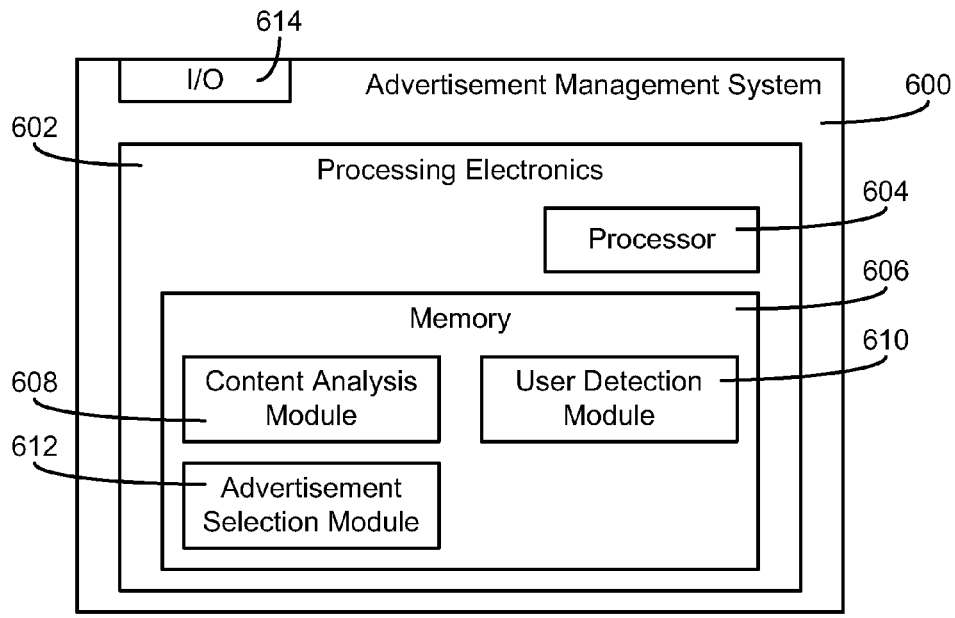
FIG. 6 is a block diagram of processing electronics configured to execute the systems and methods of the present disclosure, in accordance with a described implementation.

Referring to FIG. 6, a more detailed block diagram of an advertisement management system 600 is shown in accordance with a described implementation. Advertisement management system 600 includes processing electronics 602 for completing the systems and methods of the present disclosure. Processing electronics 602 is shown to include a processor 604 and memory 606. Processor 604 may be implemented as a general purpose processor, an application specific integrated circuit (ASIC), one or more field programmable gate arrays (FPGAs), a group of processing components, or other suitable electronic processing components. Memory 606 is one or more devices (e.g., RAM, ROM, Flash memory, hard disk storage, etc.) for storing data and/or computer code for completing and/or facilitating the various processes described herein. Memory 606 may be or include non-transient volatile memory or non-volatile memory. Memory 606 may include data base components, object code components, script components, or any other type of information structure for supporting the various activities and information structures described herein. Memory 606 may be communicably connected to processor 604 and includes computer code or instructions for executing one or more processes described herein.

Memory 606 includes various modules for completing the methods described herein. It should be understood that memory 606 may include more or less modules, and that some of the activity described as occurring within memory 606 and processing electronics 602 may be completed by modules located remotely from advertisement management system 600 or processing electronics 602.

Memory 606 is shown to include a content analysis module 608. Content analysis module 608 is configured to receive an input and determine content information relating to the input. For example, the input may be or include information such as program annotations, EPG information, subtitles, text, etc. Content analysis module 608 receives the content information and performs an analysis that determines a subject or other categorization of the content information. For example, content analysis module 608 may generate keywords for use by the other modules of advertisement management system 500.

Advertisement selection module 612 may receive such an input from content analysis module 608 and use the analysis to select types of advertising or advertisements to show to the user. For example, advertisement selection module 612 may select advertisements based on keyword bids, keywords, or other properties as described in the implementation shown in FIGS. 1-2. Advertisement selection module 612 is shown local to advertisement management system 600; it should be understood that in other implementations, advertisement selection module 612 may be remotely located from advertisement management system 600 and may be connected to via a network (e.g., advertisement selection module 612 may be connected to advertisers 108).

Memory 606 further includes user detection module 610. User detection module 610 may receive usage information from one or more electronic devices and is configured to determine the identity of the user of the electronic devices. Upon detection of the identity of the user, and the detection of the use of multiple electronic devices, user detection module 610 may determine if the same user is using the multiple electronic devices that are connected to advertisement management system 600. If the same user is using the multiple electronic devices, then advertisement management system 600 may be used to select advertisements for the different media channels.

User detection module 610 may identify users in various ways. In one implementation, user detection module 610 receives login information or ID information from the media channels. For example, user login information for a website, computer program, or other application may be used to identify the user. In another embodiment, the media channels may include a video input and identify a user of a media channel via a captured image. In another implementation, one or more of the media channels may be configured to detect proximity to a second media channel and determine that the same user is using the two media channels if the two media channels are close enough. For example, when a user of a laptop is next to a television, a proximity between the laptop and television may be determined by the two devices (e.g., via Bluetooth). The proximity information is then used to verify that the user is using both the laptop and television. In another implementation, a textual input may be received by user detection module 610 from a media channel (e.g., an input typed in by a user on a keyboard).

Advertisement management system 600 includes an input/output (I/O) interface 614 configured to receive data from various media channels and to transmit advertisements and advertisement information to the various media channels as described above. I/O interface 614 is configured to facilitate communications, either via a wired connection or wirelessly, with the multiple media channels, network, advertisers, and other devices as described in the present disclosure.

Figure 7:
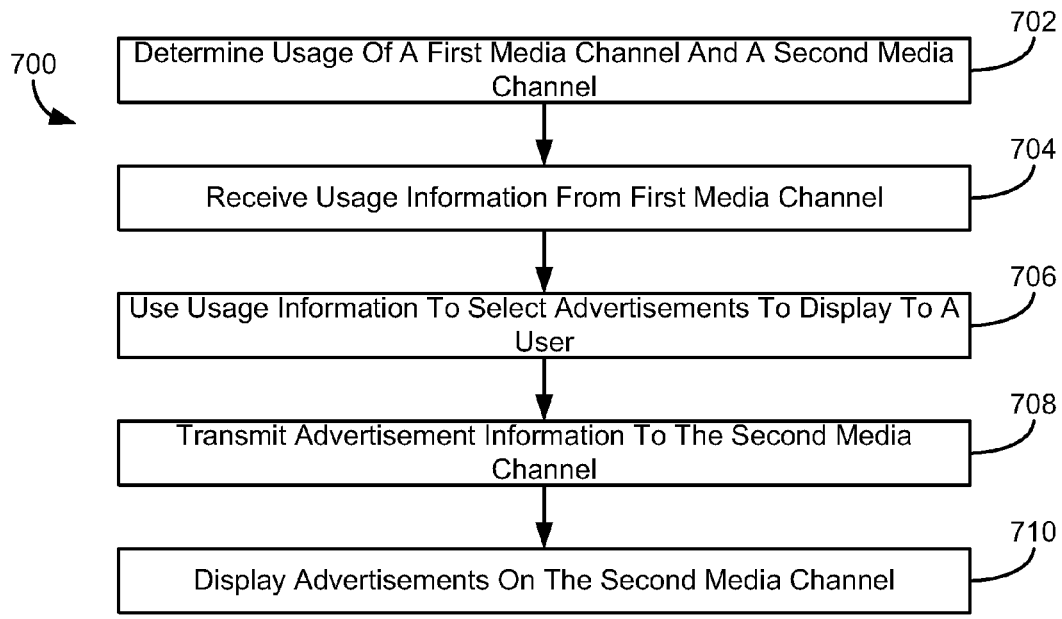
FIG. 7 is a flow chart of a process for selecting and displaying advertisements on a media channel based on usage information, in accordance with a described implementation.

Referring to FIG. 7, a flow chart of a process 700 for selecting advertisements for display on a media channel is shown, according to an exemplary embodiment. Process 700 may be used to optimize advertisement selection for display on a media channel based on usage information of another media channel.

In a block 702, process 700 includes determining usage of a first media channel and a second media channel. The media channels may be displayed on a tablet, laptop, PC, mobile phone, television, or other electronic device. Determining the usage may include determining user activity on one or more electronic devices displaying the media channels (e.g., a television program being watched and the Internet being surfed on a tablet). Block 702 may further include identifying one or more electronic devices that are simultaneously being used by the same user. The identification may be performed based on identification information (e.g., login information) received from the devices, other data collected from the devices, and so on.

In a block 704, process 700 further includes receiving usage information from the first media channel. The usage information may include user identification information, media content information, and other information that can be used to determine an optimal advertisement.

In a block 706, process 700 further includes using the usage information to select advertisements to display to a user. Block 706 may further include using user identification information in selecting the advertisements. Selecting advertisements may be done by, for example, the processing electronics 602 of FIG. 6.

In a block 708, process 700 further includes transmitting the advertisement information to the second media channel. Advertisement information for the custom selected advertisements may include the actual advertisement, information that allows the second media channel to access the advertisements via a network or advertisers, information that allows the second media channel to create the advertisement, etc. In one implementation, the actual advertisement is sent to the second media channel. In another implementation, the actual advertisement may be accessed from the advertisers, from a database local to the second media channel, or otherwise, and the advertisement information transmitted to the second media channel includes instructions for accessing the advertisement. In yet another implementation, the advertisement information includes images, video, or other types of visual or audio displays for a website, and either the advertisement management system transmitting the advertisement information or the second media channel may be configured to use the advertisement information to render the advertisement. In a block 710, process 700 further includes displaying the advertisements on the second media channel using the advertisement information.

Configurations of Various Exemplary Implementations

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application-specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD-ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front-end component (e.g., a client computer) having a graphical user interface or a Web browser through which a user may interact with an implementation of the subject matter described in this disclosure, or any combination of one or more such back-end, middleware, or front-end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    receiving, by a processor executing on a server, a request for an advertisement to present via a first media channel;
    determining that content presented via the first media channel and content presented via an additional media channel are being concurrently consumed at a location, wherein the first media channel and the additional media channel are different media channels selected from a group consisting of a website channel, a television channel, a radio channel, a movie channel, and a print channel;
    receiving usage information regarding the content being consumed at the location via the additional media channel;
    assigning, based on the usage information, interest data to at least one of a user and the additional media channel; and
    selecting, by a local processor local to one of the first media channel and the additional media channel, based on the assigned interest data, while the content presented via the first media channel and the content presented via the additional media channel are being concurrently consumed at the location, an advertisement to concurrently present via the first media channel at the location, wherein the local processor receives usage information from the other of the first media channel and the additional media channel.

2. The method of claim 1, further comprising:
    determining a usage of the first media channel and the additional media channel; and
    transmitting advertisement information via one of the first media channel and the additional media channel.

3. The method of claim 2, further comprising:
    identifying the user to whom the interest data is assigned;
    wherein the selecting is also performed based on the user identity.

4. The method of claim 1, wherein the selecting of the advertisement occurs remotely from one of the first media channel and the additional media channel.

5. The method of claim 1, wherein the usage information includes at least one of program annotations, electronic program guide information, subtitles, or text.

6. One or more non-transitory computer readable media having instructions stored therein, the instructions being executable by one or more processors to cause the one or more processors to perform operations, comprising:
    receiving a request for an advertisement to present via a first media channel;
    determining that content presented via the first media channel and content presented via an additional media channel are being concurrently consumed at a location, wherein the first media channel and the additional media channel are selected from a group consisting of a television channel, a website channel, a radio channel, a movie channel, and a print channel;
    receiving usage information regarding the content being consumed at the location via the additional media channel;
    assigning, based on the usage information, interest data to at least one of a user and the additional media channel; and
    selecting, by a local processor local to one of the first media channel and the additional media channel, based on the assigned interest data, while the content presented via the first media channel and the content presented via the additional media channel are being concurrently consumed at the location, an advertisement to concurrently present at the location via the first media channel, wherein the local processor receives usage information from the other of the first media channel and the additional media channel.

7. The computer readable media of claim 6, wherein the instructions further comprise:
    determining a usage of the first media channel and the additional media channel; and
    transmitting advertisement information via one of the first media channel and the additional media channel.

8. The computer readable media of claim 7, wherein the instructions further comprise:
    identifying the user to whom the interest data is assigned;
    wherein the selecting is also performed based on the user identity.

9. The computer readable media of claim 6, wherein the selecting of the advertisement occurs remotely from the first media channel and the additional media channel.

10. The computer readable media of claim 6, wherein the usage information includes at least one of program annotations, electronic program guide information, subtitles, or text.

11. A method comprising:
    receiving a request for an advertisement to present via a first media channel;
    determining that content presented via the first media channel and content presented via a second media channel are being concurrently consumed at a location, wherein the first media channel and second media channel are different modalities;
    receiving usage information regarding the content being consumed at the location via the second media channel;
    assigning, based on the usage information, interest data to at least one of a user and the second media channel; and selecting, by a local processor local to one of the first media channel and the second media channel, based on the assigned interest data, while the content presented via the first media channel and the content presented via the additional media channel are being concurrently consumed at the location, an advertisement to concurrently present via the first media channel at the location, wherein the local processor receives usage information from the other of the first media channel and the second media channel.

12. The method of claim 11, further comprising:
determining usage of the first media channel and second media channel; and
transmitting advertisement information via the first media channel.

13. The method of claim 12, further comprising:
identifying the user to whom the interest data is assigned; wherein the selecting is also performed based on the user identity.

14. The method of claim 11, wherein the selecting of the advertisement occurs remotely from one of the first media channel and the second media channel.

15. The method of claim 11, wherein the usage information includes at least one of program annotations, electronic program guide information, subtitles, or text.

16. The method of claim 11, wherein the modality of the first media channel is one of a television channel and a website channel and the modality of the second media channel is the other of the television channel and the website channel.

17. The method of claim 11, wherein the modality of the first media channel and the second media channel are different ones of a television channel, website channel, radio channel, movie channel, and a print channel.

* * * * *